United States Patent
Cui et al.

(10) Patent No.: US 9,329,845 B2
(45) Date of Patent: May 3, 2016

(54) DETERMINING TARGET TYPES FOR GENERIC POINTERS IN SOURCE CODE

(75) Inventors: Weidong Cui, Redmond, WA (US); Marcus Peinado, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1234 days.

(21) Appl. No.: 12/477,954

(22) Filed: Jun. 4, 2009

(65) Prior Publication Data

US 2010/0313190 A1    Dec. 9, 2010

(51) Int. Cl.
 *G06F 9/45*    (2006.01)
(52) U.S. Cl.
 CPC ..................... *G06F 8/434* (2013.01)
(58) Field of Classification Search
 CPC ..... G06F 8/434; G06F 8/443; G06F 11/3608; G06F 11/3604; G06F 8/433; G06F 8/43; G06F 8/75; G06F 21/14; G06F 2221/2145; G06F 8/437; G06F 11/3471
 USPC .......... 717/104, 132, 133, 144, 155, 156, 157
 See application file for complete search history.

(56) References Cited

U.S. PATENT DOCUMENTS

| | | | | |
|---|---|---|---|---|
| 6,014,518 A * | 1/2000 | Steensgaard | ................... | 717/154 |
| 6,072,950 A * | 6/2000 | Steensgaard | ................... | 717/126 |
| 6,077,313 A * | 6/2000 | Ruf | ....................... | G06F 8/433 |
| | | | | 717/155 |
| 6,202,202 B1 * | 3/2001 | Steensgaard | ................... | 717/127 |
| 6,457,023 B1 * | 9/2002 | Pinter | .................... | G06F 8/434 |
| 6,813,761 B1 * | 11/2004 | Das | ........................ | G06F 8/433 |
| | | | | 717/132 |
| 7,003,760 B1 * | 2/2006 | Das | ........................ | G06F 8/434 |
| | | | | 717/124 |
| 7,047,447 B2 * | 5/2006 | Cantrill | ..................... | 714/38.11 |
| 7,058,925 B2 * | 6/2006 | Ball | ..................... | G06F 11/3608 |
| | | | | 714/E11.207 |
| 7,657,867 B2 * | 2/2010 | Ball | ..................... | G06F 11/3608 |
| | | | | 717/106 |
| 7,962,901 B2 * | 6/2011 | McCamant | ......... | G06F 11/3612 |
| | | | | 703/22 |
| 8,006,233 B2 * | 8/2011 | Centonze | ................. | G06F 8/75 |
| | | | | 717/125 |
| 8,434,064 B2 * | 4/2013 | Akritidis | ............ | G06F 11/3612 |
| | | | | 717/100 |
| 2002/0010911 A1 * | 1/2002 | Cheng | .................... | G06F 8/443 |
| | | | | 717/128 |
| 2003/0167458 A1 * | 9/2003 | Santhanam et al. | ......... | 717/114 |
| 2004/0003382 A1 * | 1/2004 | Steensgaard | ........... | G06F 8/437 |
| | | | | 717/154 |
| 2004/0015902 A1 * | 1/2004 | Kosche | ................... | G06F 8/434 |
| | | | | 717/141 |
| 2006/0080641 A1 * | 4/2006 | Taylor et al. | .................. | 717/126 |
| 2008/0229286 A1 * | 9/2008 | Kahlon | ............... | G06F 11/3604 |
| | | | | 717/126 |
| 2008/0288834 A1 * | 11/2008 | Manovit | .................. | G06F 11/28 |
| | | | | 714/718 |

(Continued)

OTHER PUBLICATIONS

Pearce, David J., "Efficient Field-Sensitive Pointer Analysis of C", ACM Transactions on Programming Languages and Systems, vol. 30, No. 1, Article 4, Nov. 2007.*

(Continued)

*Primary Examiner* — Francisco Aponte
(74) *Attorney, Agent, or Firm* — Alin Corie; Sandy Swain; Micky Minhas (57) ABSTRACT

A system described herein includes a receiver component that receives source code from a computer-readable medium of a computing device and a static analysis component that executes a points-to analysis algorithm over the source code to cause generation of a points-to graph, wherein the points-to graph is a directed graph that comprises a plurality of nodes and a plurality of edges, wherein nodes of the points-to graph represent pointers in the source code and edges represent inclusion relationships in the source code. The system also includes an inference component that infers target types for generic pointers in the source code based at least in part upon known type definitions and global variables in the source code.

20 Claims, 10 Drawing Sheets

(56) References Cited

U.S. PATENT DOCUMENTS

| | | | |
|---|---|---|---|
| 2008/0320451 A1* | 12/2008 | Brand | G06F 8/434 717/132 |
| 2009/0125887 A1* | 5/2009 | Kahlon | G06F 11/3608 717/126 |
| 2010/0058475 A1* | 3/2010 | Thummalapenta | H04L 63/1433 726/25 |

OTHER PUBLICATIONS

Shapiro, Marc and Horwitz, Susan, "Fast and Accurate Flow-Insensitive Points-to Analysis", POPL '97 Proceedings of the 24th ACM SIGPLAN—SIGACT Symposium on Principles of Programming Languages. pp. 1-14. 1997.*

Liang, Donglin and Harrold, Mary Jean, "Efficient Points-to Analysis for Whole-Program Analysis", ESEC/FSE '99, LNCS 1687, pp. 199-215, 1999.*

Steensgaard, Bjarne. "Points-to Analysis by Type Inference of Programs with Structures and Unions". CC '96 Proceedings of the 6th International Conference on Compiler Construction. 1996. pp. 136-150.*

Steensgaard, Bjarne. "Points-to Analysis in Almost Linear Time". Proceedings of the 23rd ACM SIGPLAN-SIGACT symposium on Principles of programming languages. pp. 32-41. Jan. 21-24, 1996. St. Petersburg Beach, Florida, United States.*

Emami et al. "Context-sensitive Interprocedural Points-to Analysis in the Presence of Function Pointers". Proceedings of the ACM SIGPLAN 1994 conference on Programming language design and implementation. pp. 242-256. Jun. 20-24, 1994. Orlando, Florida, USA.*

Practical Pointer Aliasing Analysis—by Xiang-Xiang Sean Zhang—A dissertation submitted to the Graduate School|New Brunswick Rutgers, The State University of New Jersey—New Brunswick, New Jersey—Oct. 1998.*

Static Program Analysis via 3-Valued Logic—Thomas W. Reps, Comp. Sci. Dept., University of Wisconsin—Mooly Sagiv, School of Comp. Sci., Tel Aviv University—Reinhard Wilhelm, Informatik, Univ. des Saarlandes—R. Alur and D.A. Peled (Eds.): CAV 2004, LNCS 3114, pp. 15-30, 2004.*

Points-to Analysis by Type Inference of Programs with Structures and Unions—Bjarne Steensgaard—Microsoft Research—2005.*

\* cited by examiner

```
1:   SLIST_ENTRY WrapDataListHead;

2:   typedef struct _WRAP_DATA {
3:       SLIST_ENTRY List;
4:       int32       Type;
5:       void*       PData;
6:   } WRAP_DATA;

7:   typedef struct _BIN_DATA {
8:       int32       BinLength;
9:       char*       BinData;
10:  } BIN_DATA;

11:  typedef struct _TXT_DATA {
12:      char*       TxtData;
13:  } TXT_DATA;

14:  void InsertSList
15:  (SLIST_ENTRY *Head, SLIST_ENTRY *Entry)
16:  {
17:      Entry->Flink = Head->Flink;
18:      Head->Flink = Entry;
19:  }

20:  void InsertWrapList (int32 type, void *data)
21:  {
22:      WRAP_DATA *WrapData = AllocateWrapData();
23:      WrapData->Type = type;
24:      WrapData->PData = data;
25:      InsertSList(&WrapDataListHead, &WrapData->List);
26:  }

27:  void InsertTxtData(TXT_DATA *txt_data)
28:  {
29:      InsertWrapList(0, txt_data);
30:  }

31:  void InsertBinData(BIN_DATA *bin_data)
32:  {
33:      InsertWrapList(1, bin_data);
34:  }
```

FIG. 4

```
_InsertWrapList:
 _type, _data
 t282, (*CallTag)      =  ENTERFUNCTION              #21
 WrapData              =  CALL* &_AllocateWrapData   #21
 _WrapData             =  ASSIGN t282                #22
 t283                  =  ADD _WrapData, 4           #22
 [t283]*               =  ASSIGN _type               #23
 t284                  =  ADD _WrapData, 8           #23
 [t284]*               =  ASSIGN _data               #24
 t285                  =  ADD _WrapData, 0           #24
 t286                  =  CONVERT t285               #25
 CALL* &_InsertSList, &_WrapDataListHead, t286       #25
                          EXITFUNCTION               #26
```

DETERMINING TARGET TYPES FOR GENERIC POINTERS IN SOURCE CODE

BACKGROUND

In the recent past, computing devices have transformed from relatively expensive, low functionality machines to relatively inexpensive machines that can perform a variety of functions including browse the Internet, manage finances, generate documents, perform complex mathematical computations, etc. To allow for such functionality in modern computing devices, processors can be configured to execute relatively complex code. In an example, source code pertaining to a kernel of an operating system may be thousands or millions of lines of code, wherein such code can include generic pointers. Use of generic pointers in code renders it difficult to ascertain a type of a data object pointed to by such generic pointer.

Pursuant to an example, modern operating systems are vulnerable to various types of attacks. For instance, kernel mode malware represents a significant threat because of an ability to compromise the security of the kernel and thus an entirety of a software stack. For instance, kernel mode malware can tamper with kernel code and data to hide itself and collect useful information from certain system events (e.g., keystrokes). To mitigate the security threat, integrity of the kernel code in its entirety and data corresponding thereto should be verified. It is, however, relatively difficult to check integrity of dynamic data corresponding to the kernel of the operating system due to unpredictable memory locations of the dynamic data and constantly changing nature.

Locating dynamic kernel objects in memory in a computing system and identifying types of such objects is a first step toward enabling systematic integrity checks of dynamic kernel data. For example, to locate a dynamic data object, a reference to such object must be found which is often in the form of a pointer. In conventional systems that are configured to traverse memory of the computing system and follow pointer references to determine types of data objects, generic pointers are unable to be followed because such systems leverage type definitions only, and thus cannot ascertain target data object types of generic pointers.

SUMMARY

The following is a brief summary of subject matter that is described in greater detail herein. This summary is not intended to be limiting as to the scope of the claims.

Various technologies pertaining to determining/inferring types of data objects pointed to by generic pointers in source code are described herein. For example, the technologies described herein may be sufficiently robust as to allow source code pertaining to a kernel of an operating system to be analyzed such that target data object types corresponding to generic pointers in the source code of the kernel can be ascertained.

Pursuant to an example, source code for a program or operating system can be received and a static analysis can be undertaken with respect to such source code. For instance, an inter-procedural inclusion-based points-to analysis can be undertaken to generate a points-to graph (also referred to as a points-to analysis graph). A points-to graph is a graph that includes a plurality of nodes and a plurality of edges, where the nodes are representative of pointers existent in the source code and edges are representative of inclusion relationships pertaining to the pointers in the source code. For example, an edge from node X to node Y in the points-to graph can indicate that any object pointers that can be derived from the pointer represented by node X are also derivable from the pointer represented by node Y. Additionally, pursuant to an example, the generated points-to graph can be maintained as a pre-transitive graph (e.g., the points-to graph is not transitively closed).

The pre-transitive points-to graph may then be analyzed to infer candidate target data object types for generic pointers (such as void pointers). Specifically, generic pointers are pointers whose target data object types cannot be extracted from definitions of such data object types. Generic pointers can include void pointers, pointers defined inside linked list related structures that are nested inside objects, or other pointers whose target data object types cannot be extracted from their definitions.

Based at least in part upon the points-to graph and inferred candidate target data object types for generic pointers, a type graph can be generated. The type graph is a directed graph where each node in the graph is either a data object type or a global variable, and each edge connects two nodes with a label of (m, n). The label indicates that a pointer field at offset m in the source node points to the target node at offset n. It is to be noted that such a type graph includes edges corresponding to generic pointer fields that cannot be derived from only data object type definitions.

This type graph may then be used to perform a memory analysis by using such type graph to traverse a snapshot of kernel memory. Such a memory analysis can be used in connection with locating memory leaks corresponding to an operating system, to locate malware executing in an operating system, amongst other applications.

Other aspects will be appreciated upon reading and understanding the attached figures and description.

DETAILED DESCRIPTION

Various technologies pertaining to inferring target data object types for generic pointers in source code will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
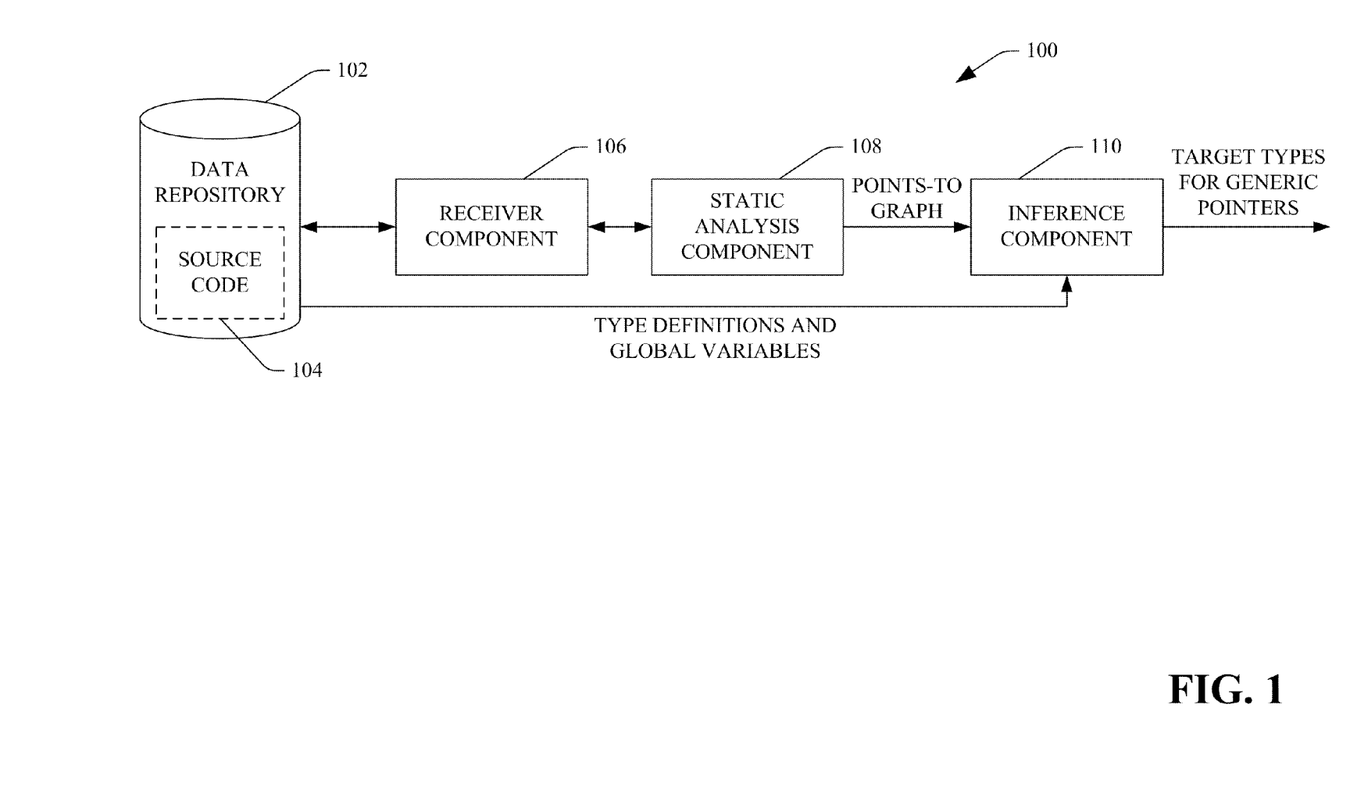
FIG. 1 is a functional block diagram of an example system that facilitates inferring target data object types for generic pointers.

With reference to FIG. 1, an example system 100 that facilitates determining target data object types for generic pointers in source code is illustrated. The system 100 includes a data repository 102 that comprises source code 104. For example, the source code may be source code for an operating system kernel. Thus, the source code 104 may be thousands or millions of lines of code. In another example, the source code 104 may pertain to a word processing program. In still another example, the source code 104 may be configured in connection with supporting an application programming interface. Accordingly, the source code 104 may be for any suitable program/operating system, etc.

The system 100 also includes a receiver component 106 that receives the source code 104 from the data repository 102. It is to be understood that the data repository 102 may be a hard drive, may be memory or any other suitable computer readable medium of a computing device. A static analysis component 108 is in communication with the receiver component 106. The static analysis component 108 can be configured to execute a points-to analysis algorithm over the source code 104. Executing such an algorithm over the source code 104 can cause the static analysis component 108 to generate and output a points-to graph. For instance, the points-to graph can be a directed graph that comprises a plurality of nodes and a plurality of directed edges that couple nodes in the directed graph. Furthermore, nodes in the points-to graph can represent pointers in the source code and edges in the points-to graph can represent inclusion relationships in the source code 104. For example, an inclusion relationship can refer to a property such that an edge from a first node in the points-to graph that represents a pointer to a second node in the points-to graph that represents a second pointer indicates that any object pointers that can be derived from the second pointer are also derivable from the first pointer. Furthermore, the points-to graph may be a pre-transitive graph (e.g., the points-to graph is not transitively closed).

The system 100 further comprises an inference component 110 that can infer target data object types for generic pointers in the source code 104 based at least in part upon the points-to graph output by the static analysis component 108 and known data object type definitions and global variables in the source code 104 (obtained from a compiler, for instance). Pursuant to an example, generic pointers can refer to pointers whose target data object types cannot be extracted from definitions corresponding to such pointers. Thus, for instance, a generic pointer may be a void pointer and/or a pointer defined inside a link list related structure that is nested inside a data object.

Pursuant to an example, the inference component 110 can receive the points-to graph and the known data object type definitions and global variables and generate a type graph, wherein the type graph is based at least in part upon target data object types for the generic pointers in the source code 104 ascertained by the inference component 110. For example, the type graph generated by the inference component 110 can be a directed graph that includes a plurality of nodes and edges that connect nodes. For instance, the type graph can be a directed graph and each edge in the type graph can be labeled to indicate offsets pertaining to data object types and/or global variables represented by nodes corresponding to the edge. In more detail with respect to the type graph, such type graph can include nodes that represent data object types and/or global variables and directed edges between such nodes can be labeled with a label of (m, n). This means that a pointer field at an offset m in the data object type or global variable represented by a source node points to a data object type or global variable represented by a target node at offset n. It is to be understood that the type graph generated by the inference component 110 can include edges corresponding to generic pointer fields which do not exist in a type graph derived solely from type definitions in the source code 104.

The type graph generated by the inference component 110 can be used in connection with performing a memory analysis. For instance, a memory snapshot can be generated and the type graph can be utilized to traverse the memory corresponding to the source code 104 (e.g., the kernel memory). Based upon such traversal an object graph can be generated, wherein nodes are instances of objects in the memory snapshot and edges are pointers connecting these objects. Data integrity checks may then be performed based at least in part upon the object graph.

In an example operation of the system 100, the receiver component 106 can receive the source code 104 which may be for an operating system kernel and written in C or C++ programming language. The static analysis component 108 can compute a set of logical objects that each pointer in the source code 104 may point to (referred to as the points-to set for that pointer). Such logical objects can include local and global variables as well as dynamically allocated objects. The points-to algorithm executed by the static analysis component 108 can be field sensitive and context sensitive. Field sensitive refers to distinguishing fields inside an object while context sensitive refers to distinguishing calling context pertaining to objects. Context-sensitivity can be enforced by checking if a sequence of call/return operations in the source code is valid. An example set of rules that can be employed by the static analysis component 108 in connection with executing the points-to analysis algorithm is described in greater detail below. As noted above, the inference component 110 can receive the points-to graph output by the static analysis component 108 and can infer candidate data object target types for generic pointers. The inference component 110 may then generate a type graph based at least in part upon the inferred candidate data object target types and data object type definitions and global variables in the source code 104. The type graph output by the inference component 110 may include at least three sets of information: 1) object type definitions; 2) declared types and relative addresses of global variables; and 3) candidate target types for generic pointers. Sets if information 1 and 2 can be retrieved from a compiler. Determining target data object types for generic pointers is described in greater detail below.

Figure 2:
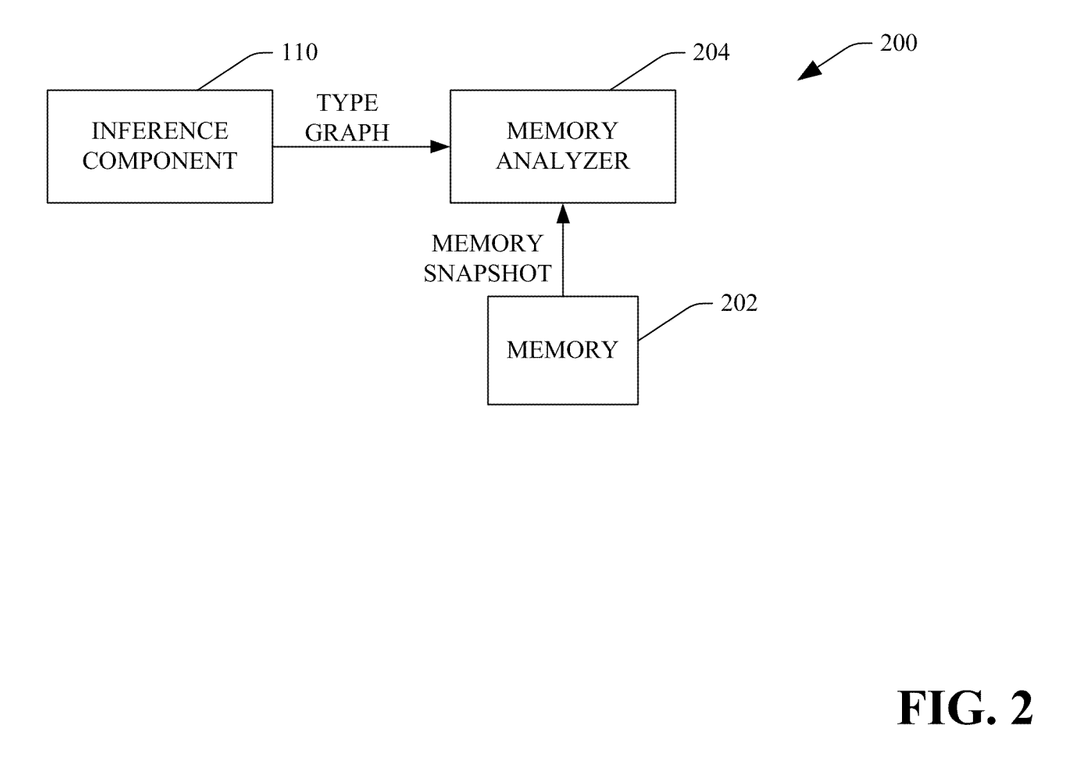
FIG. 2 is a functional block diagram of an example system that facilitates analyzing a memory snapshot through use of a type graph.

With reference now to FIG. 2, an example system 200 that facilitates performing a memory analysis on a type graph is illustrated. The system 200 includes the inference component 110 that outputs a type graph, wherein the type graph includes a plurality of nodes that represent data types or global variables and a plurality of edges that connect a subset of the nodes in the type graph. As noted above, the type graph includes three sets of information: object type definitions, declared types and relative addresses of global variables and candidate target data object types for generic pointers.

The system 200 further includes a memory 202 of a computing device. A memory analyzer component 204 can receive a snapshot of the memory 202. The memory analyzer component 204 may perform an analysis with respect to the memory 202 by traversing such memory through utilization of the type graph and output an object graph upon traversing the memory. The object graph output by the memory analyzer component 204 can include a plurality of nodes and a plurality of edges that can connect nodes in the object graph. A node in the object graph can represent instances of objects in the memory snapshot and edges in the object graph can represent pointers connecting such objects. Integrity checks such as kernel data integrity checks may be performed based at least in part upon the object graph. For instance, memory leaks in connection with an operating system can be located through utilization of the object graph.

Figure 3:
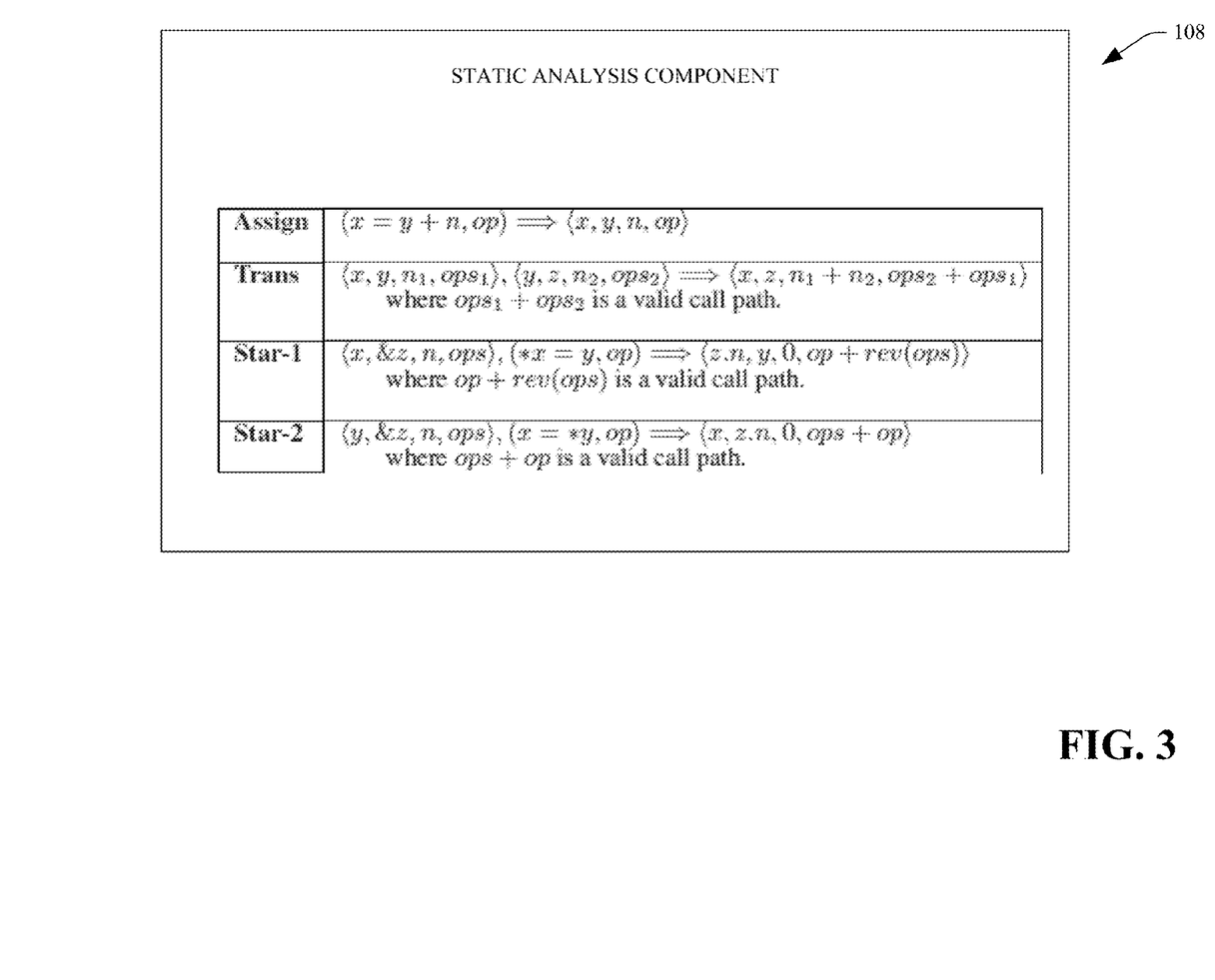
FIG. 3 illustrates example rules that can be employed by a component that facilities static analysis of source code.

Now referring to FIG. 3, an example depiction of the static analysis component 108 is illustrated. As described above, the static analysis component 108 can receive source code and generate a points-to graph pertaining to the source code. The static analysis component 108 can compute a set of logical data objects that each pointer in the source code may point to (referred to as the points-to set for that pointer). The logical data objects include local and global variables as well as dynamically allocated variables. As noted above, an analysis performed by the static analysis component 108 can be both field sensitive and context sensitive. This is in contrast to field-based analysis where all instances of a field are treated as one variable. In field-sensitive analysis, each field instance is treated separately and thus field-sensitive analysis is more precise. The static analysis component 108 uses a plurality of rules in connection with performing a field sensitive and context sensitive analysis with respect to generating the points-to graph. For example, for utilization of temporary variables, pointer assignments can be transformed into four canonical forms: x=y, x=&y, *x=y, and x=*y. To handle pointer offsets, the first two assignment forms as shown in the static analysis component 108 can be x=y+n and x=&y+n, where n is the pointer offset. To enable context sensitivity, each assignment can have a variable op that specifies the call or return operation involved in the assignment. It can be ascertained that op is null when the assignment occurs inside a single function. Without use of the offset n and the variable op, an edge in the points-to graph can be a pair (src, dst) and four deduction rules can be used to compute the points-to graph. To consider pointer offsets and culling context changes, semantics of edges in the points-to graph can be a four tuple (src, dst, n, ops).

Figure 5:
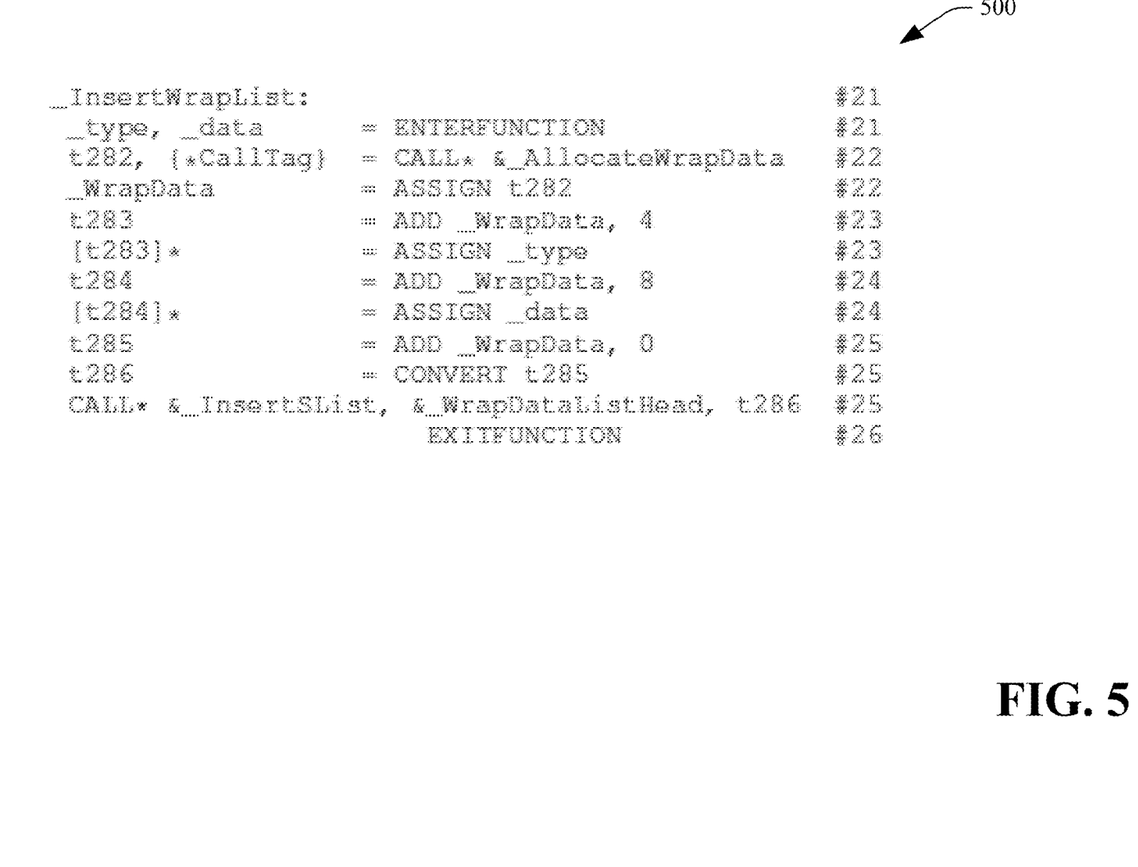
FIG. 5 is an example medium level intermediate representation for a function described in examples.

Turning briefly to FIG. 5, for instance given the pointer assignment _Entry=t286, due to the function call at line 26 the corresponding edge in the points-to graph generated by the static analysis component 108 can be (_Entry, t286, 0, call @file: 25).

As the semantics of edges can be enhanced, the deduction rules shown in the static analysis component 108 can be employed. In the Assign rule, the pointer offset n can be placed in the four tuple of the edge. In the Trans rule, the pointer offset can be summed. In the Star rules, a node z.n can be created to represent an instance of the pointer field at offset n in logical object z in connection with achieving field sensitivity. Furthermore, when a new edge is created, the sequence of call return operations involved is checked to ensure such sequence of call return operations is valid to achieve context sensitivity. A sequence is valid if it can be instantiated from a valid call path. It can also be noted that an assumption can be made that there are no recursive functions in the source code. Thus, a valid call path has at most a single call at each call site. Moreover, special rules need not be applied to global variables since a single node for each global variable is created disregarding the function context corresponding thereto. Thus, information can flow through global variables between different functions.

As noted above, the points-to graph can be a pre-transitive graph. Example pseudo code for computing such pre-transitive graph is shown below.

```
1: PointsTo(x, prev_n, prev_ops, curr_n, curr_ops) {
2: if (!isValidCallPath(prev_ops + ops)) {
3:      // invalide control flow
4:      return emptySet;
5: } else if (onPath(x)) { // a cycle
6:      return (emptySet);
7: } else {
8:      onPath(x) = 1; /* put the node on path */
9:      prev_n = prev_n + curr_n; // adjust pointer
        shift
10:     prev_ops = curr_ops + prev_ops; // merge ops
11:     ptSet = emptySet;
12:     for each <&z, n, ops> in x.baseElements {
13:     // visit each &z
14:         if (isValidCallPath(prev_ops + ops)) {
15:         // a valid control flow
16:             ptSet.Add(<&z, prev_n+n, prev_ops+ops>);
17:         }
18:     }
19:     for each <z, n, ops> in x.edges {
20:         // continue the search of points-to on
            each edge
21:         ptSet.Add(
22:             PointsTo(z, prev_n, prev_ops, n, ops));
23:     }
24:     onPath(x) = 0; // remove from the path
25:     return ptSet;
26: }
27: }
```

It is to be noted that in the above pseudo code, context sensitivity can be enforced by checking if a sequence of call/return operations is valid. Further, when a cycle is found, path traversals can be terminated.

Figure 4:
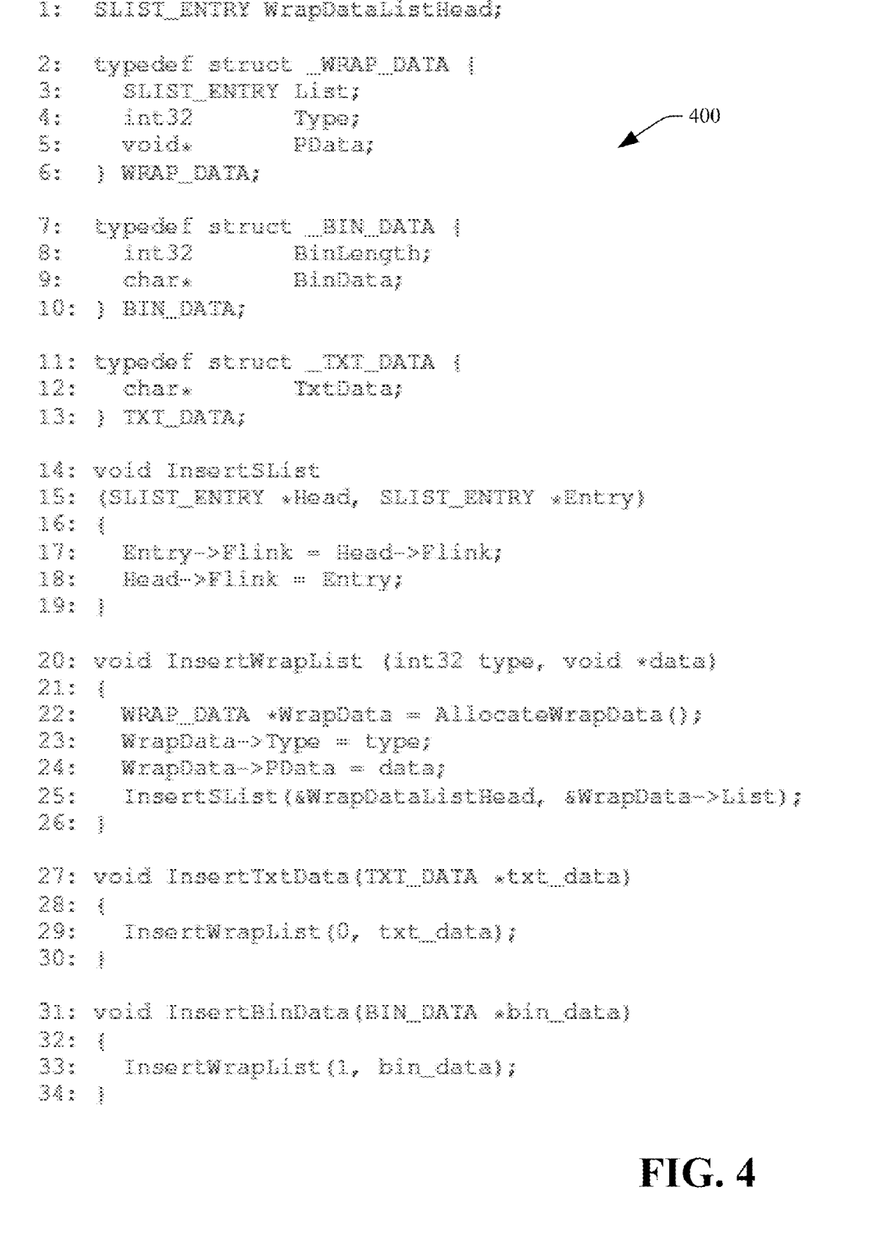
FIG. 4 is example source code.

Referring now to FIG. 4, example source code 400 of a function is illustrated, wherein such source code will be used in connection with describing operations of the inference component 110.

FIG. 5 illustrates a medium level intermediate representation 500 used by the Phoenix compiler framework of the example source code 400 of FIG. 4. Specifically, FIG. 5 illustrates source code that is a medium level intermediate representation of the function InsertWrapList in the example source code 400 depicted in FIG. 4.

Figure 6:
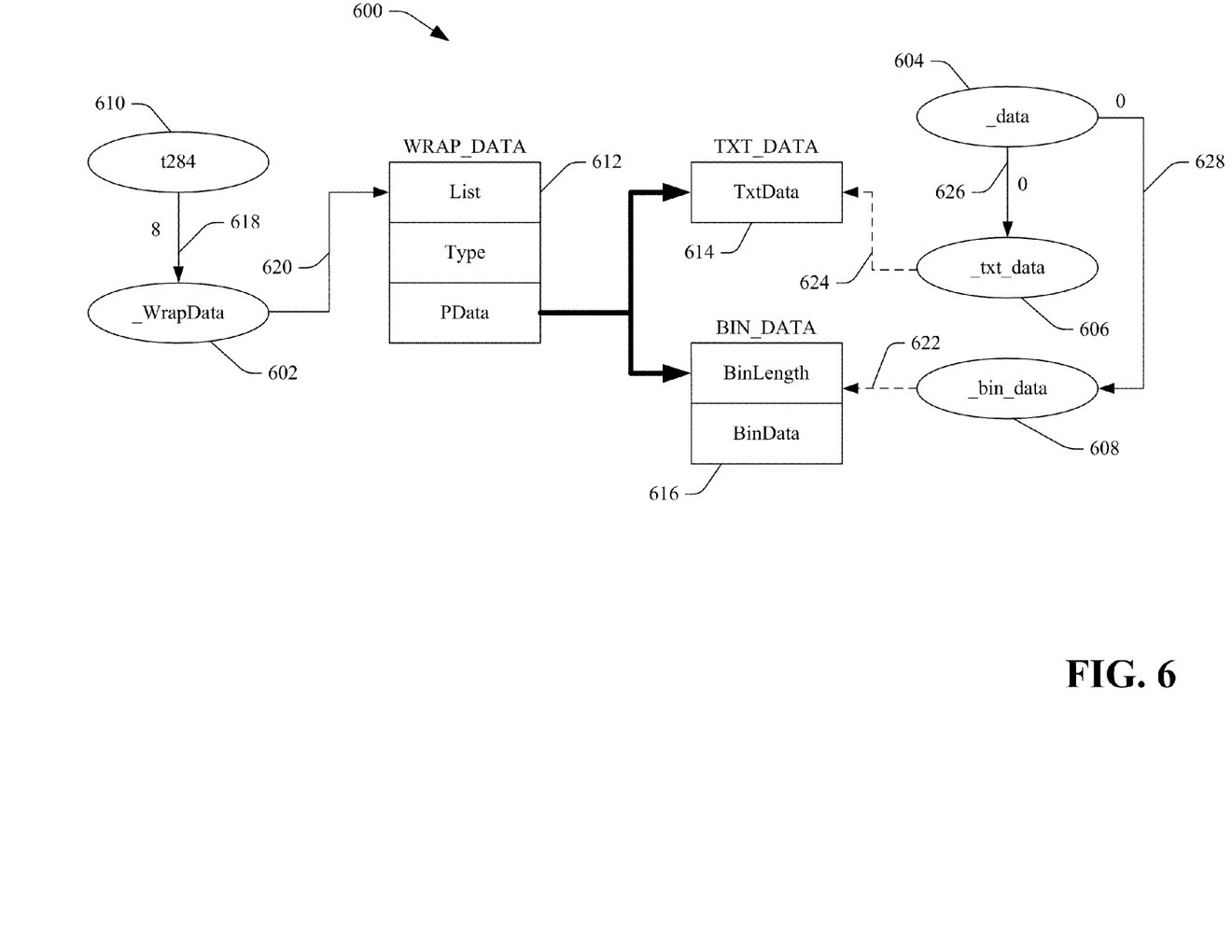
FIG. 6 is an example depiction for inferring candidate target data object types of generic pointers.

With reference now to FIG. 6, an example graph 600 that is a combination of a points-to graph and a type graph that is based upon the source code of FIGS. 4 and 5, is illustrated. Nodes shown as ellipse nodes and solid arrows are included in the points-to graph. Rectangular nodes and thicker arrows are part of the type graph. Dashed arrows are derived from type definitions of variables. As will be shown below, the graph 600 can be used in connection with deriving/inferring candidate target data object types for generic pointers by leveraging type definitions of local and global variables.

The points-to graph 600 includes a plurality of nodes 602-608 that represent pointers in the source code 400 of FIG. 4. Specifically, a first node 602 represents the pointer _WrapData, a second node 604 represents the pointer data, a third node 606 represents the pointer _txt_data, and a fourth node 608 represents the pointer _bin_data. Furthermore, the points-to graph 600 includes a fifth node 610 that represents a pointer t284 in the medium level intermediate representation of the example InsertWrapList function of the source code of FIG. 4. The points-to graph also includes nodes sixth, seventh, and eighth nodes 612, 614, and 616, respectively, that represent data object types in the example source code 400. Specifically, the sixth node 612 represents WRAP_DATA, the seventh node 614 represents TXT_DATA, and the eighth node 616 represents BIN_DATA. It can be ascertained that the data object types each comprise at least one field.

The points-to graph 600 further includes an edge 618 between the node fifth node 610 and the first node 602 with pointer offset 8. Another edge 620 connects the first node 602 and the sixth node. Based on the type definitions it can be understood that _wrapdata points to WRAP_DATA. The third node 608, which represents _bin_data, is coupled to the eighth node 614 by way of an edge 622 which indicates that _bin_data points to a particular field in BIN_DATA. The third node 606 representing _txt_data is coupled to the seventh node 614 that represents TXT_DATA by way of an edge 624, thereby indicating that _txt_data points to the TxtData field of TXT_DATA. Moreover, edges 626 and 628 indicate that a pointer represented by the second node 604 points to pointers represented by the third and fourth nodes 606 and 608, respectively, with an offset of zero.

Given an assignment *t284=_data, it can be inferred that WRAP_DATA+8, which is WRAP_DATA.PData, may point to either BIN_DATA or TEXT_DATA. Thus, although a pointer like _WrapData may not point to any logical object, a type definition corresponding to _WrapData can be leveraged to derive target data object types for WRAP_DATA.PData. Furthermore, with pointer offsets in the points-to graph 600, it can be identified that WRAP_DATA.List does not just point to an SLIST_ENTRY object but actually a WRAP_DATA object.

Figure 7:
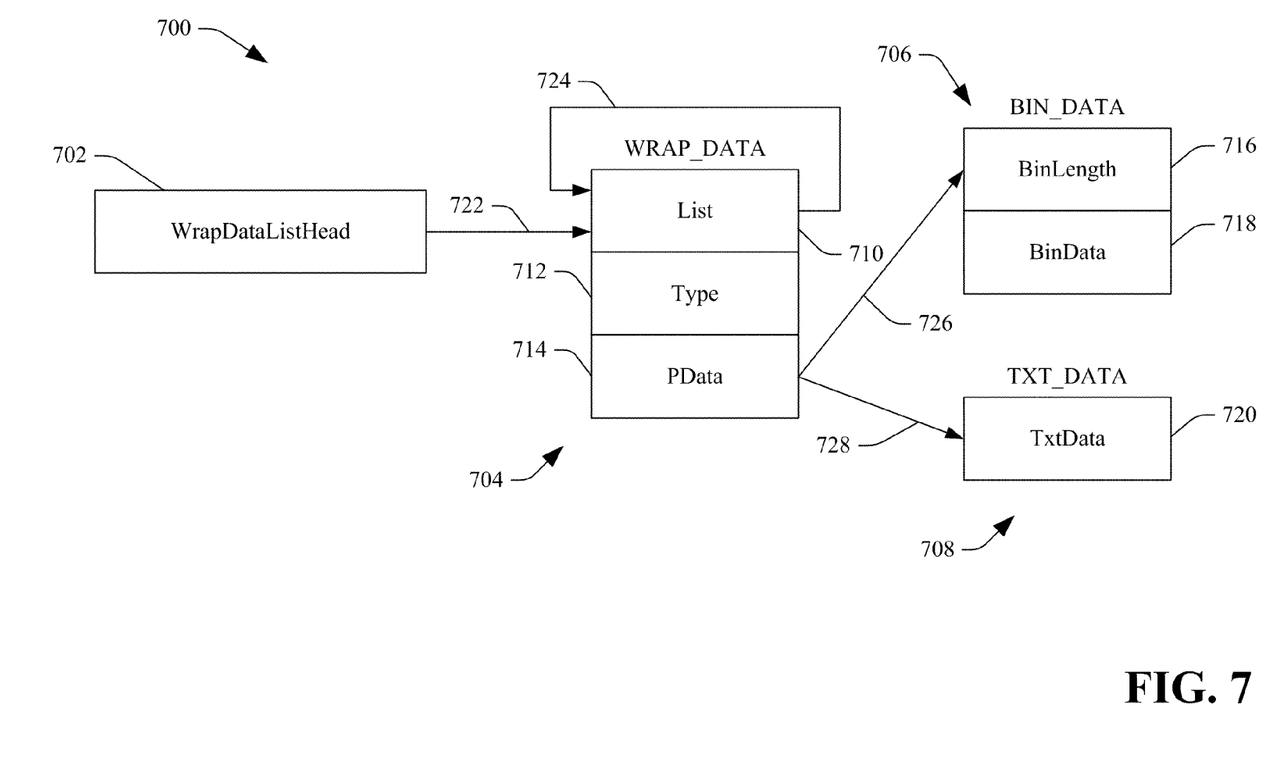
FIG. 7 illustrates a type graph for the example source code of FIGS. 4 and 5.

Referring now to FIG. 7, an example type graph 700 that can be output by the inference component 110 (FIG. 1) based upon the example source code shown in FIGS. 4 and 5 is illustrated. The example type graph 700 includes a first node 702 representing WrapDataListHead, which is a global variable, a second node 704 that represents a data object type WRAP_DATA, a third node 706 that represents a data object type BIN_DATA, and a fourth node 708 represents an object data type TXT_Data. Fields 710, 712 and 714 corresponding to the second node 704 are included in such second node 704. Additionally, the third node 706 includes two fields 716 and 718 and the fourth node 708 includes one field 720. An edge 722 indicates that a pointer field corresponding to the node 702 points to the field 710 in the node 704. An edge 724 indicates that a pointer field in the field 710 points back to the field 710. Additionally, pointer fields in the field 714 of the second node 704 can point to the field 716 of the node 706 and the field 720 of the node 708 as indicated by edges 726 and 728. As described above, the edges can have labels that indicate at what offset m the source node points to the target node at offset n.

The inference component 110 can generate such a type graph 700 as follows: for each assignment in the form *x=y, all reachable nodes in the pre-transitive graph can be searched for x and y separately (e.g., the points-to graph such as the points-to graph 600 of FIG. 6). These reachable nodes can be referred to as target set x and target set y, respectively. Then for each node a in target set x and each node b in target set y, a determination can be made to insure that a valid call path exists from a to b. If a valid call path exists, a candidate target data object type can be derived for a pointer field in the data type of a. Similarly, candidate types can be derived from assignments of the form x=*y. For example, when y is a generic pointer such as void*, such pointer will be cast back to its actual type before the program accesses the data pointed to by the pointer. Specifically, for each assignment, nodes that can reach x can be searched for which can be referred to as source set x. Thereafter, for each node a in source set x, and each node b in target set y, a determination can be made regarding whether there is a valid call path from a to b. If a valid call path exists, a candidate type for a pointer field in a data type of a can be derived/inferred.

To increase precision, a constraint can be introduced when deriving candidate types for generic pointers and linked list constructs. For example, a pointer field in SLIST_ENTRY should point to an SLIST_ENTRY structure. Such a constraint can reduce a number of incorrect candidate target types and therefore reduce possibility of errors in memory analysis.

Figure 8:
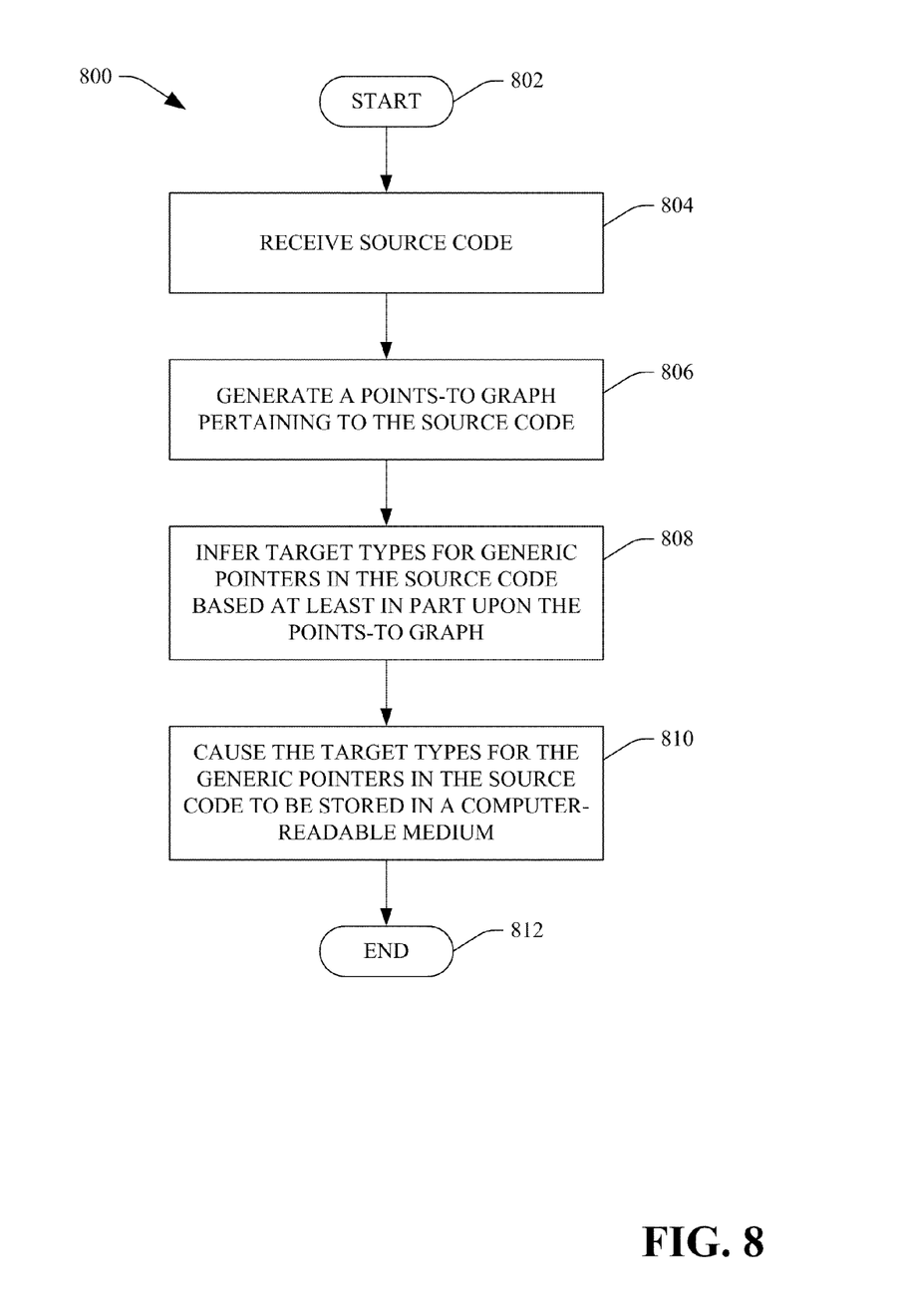
FIG. 8 is flow diagram illustrating an example methodology for inferring target data object types for generic pointers in source code.
Figure 9:
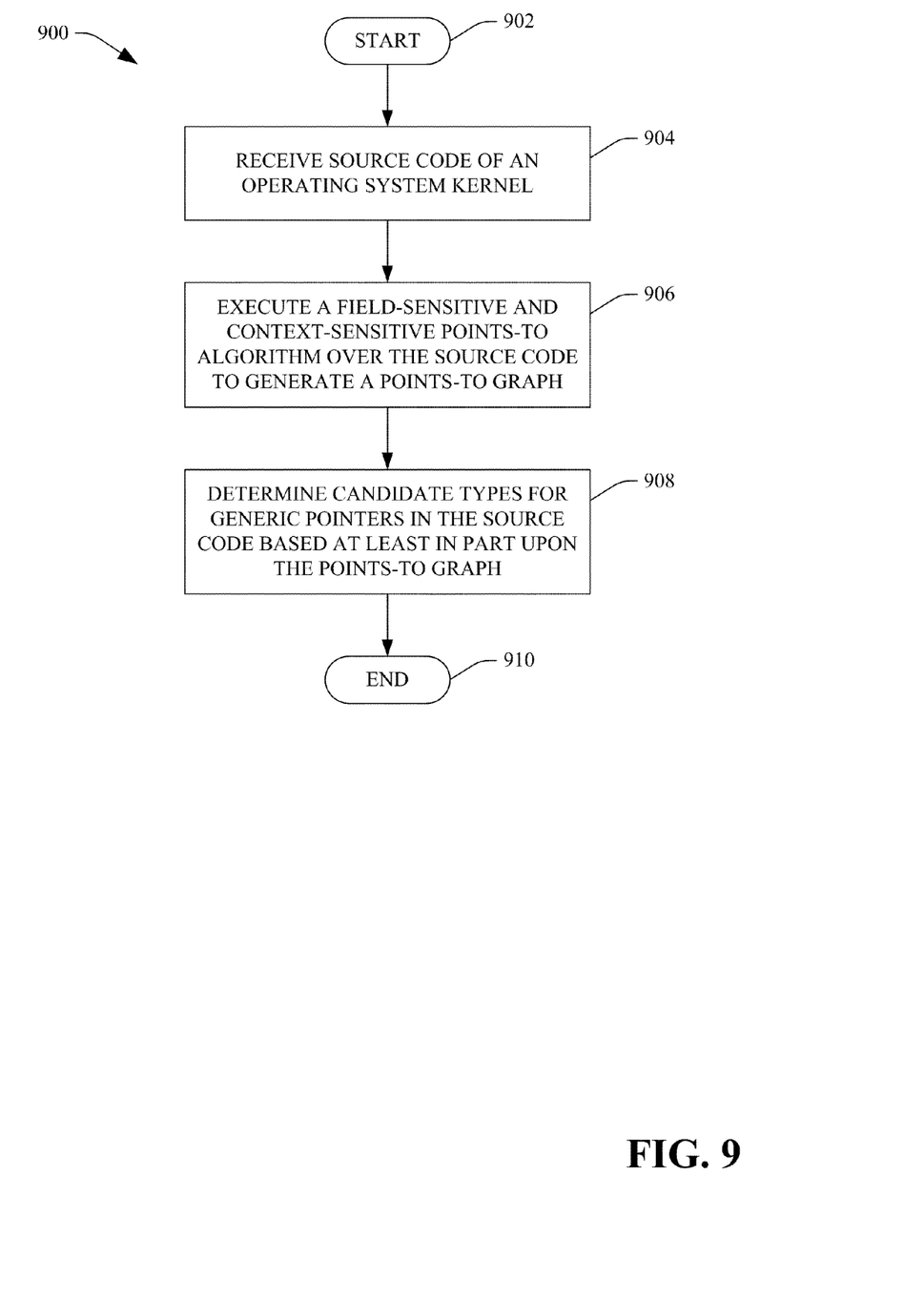
FIG. 9 is a flow diagram that illustrates an example methodology for determining candidate data object types for generic pointers in source code.

With reference now to FIGS. 8 and 9, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 8, a methodology 800 that facilitates inferring target data object types for generic pointers in source code is illustrated. The methodology 800 begins at 802, and at 804 source code is received. For instance, the source code can be source code for an operating system kernel that is contained in a computer readable medium of a computing device. In another example the source code can be written in C/C++ programming language.

At 806, a points-to graph is generated based at least in part upon execution of a points-to analysis algorithm over the source code received at 804. As noted above, the points-to graph can be a directed graph that comprises a plurality of nodes and a plurality of edges, wherein nodes of the points-to graph represent pointers in the source code and edges represent inclusion relationships in the source code. Pursuant to an example, the points-to graph can be generated based at least in part upon rules shown in FIG. 3.

At 808, target data object types for generic pointers in the source code can be inferred based at least in part upon the points-to graph. At 810, the target types for the generic pointers in the source code are caused to be stored in the computer readable medium. As noted above, these target data object types for generic pointers can be used in connection with generating a type graph. The type graph can be a directed graph where nodes represent data types or global variables and edges represent relationships between the data types or global variables connected thereby. Furthermore, each edge in the type graph can be labeled to indicate offsets pertaining to data types and/or global variables connected by an edge. For instance, a first edge in the type graph can couple a first node that represents a first data type or global variable to a second node that represents a second data type or global variable. The first edge can be labeled with a first value and a second value, wherein the first value indicates that a pointer field at a first offset in the first data type or global variable points to the second data type or global variable at a second offset.

The type graph can also include object type definitions, declared types and relative addresses of global variables and candidate target types for generic pointers. Furthermore, with respect to act 806, the points-to analysis algorithm used to generate the points-to graph can be a field sensitive algorithm as well as a context sensitive algorithm, wherein context sensitivity can be enforced by checking if a sequence of call return operations in the source code is valid. The methodology 800 completes at 812.

Referring now to FIG. 9, a methodology 900 that facilitates determining candidate types for generic pointers in source code is illustrated. The methodology 900 starts at 902, and at 904 source code of an operating system kernel is received. For example, a data repository can be accessed to retrieve the source code of the operating system kernel.

At 906, a field sensitive and context sensitive points-to algorithm is executed over the source code to generate a points-to graph. As described above, the points-to graph can be a directed graph that includes a plurality of nodes and a plurality of edges, wherein the plurality of nodes represent pointers in the source code and the plurality of edges represent inclusion relationship between pointers. Furthermore, the points-to graph can be intransitive (pre-transitive).

At 908, candidate target types of generic pointers in the source code are determined, where generic pointers are pointers whose target types are unextractable from definitions corresponding to the pointers and wherein the determined candidate target types of the generic pointers are determined based at least in part upon the points-to graph. The methodology 900 completes at 910.

Figure 10:
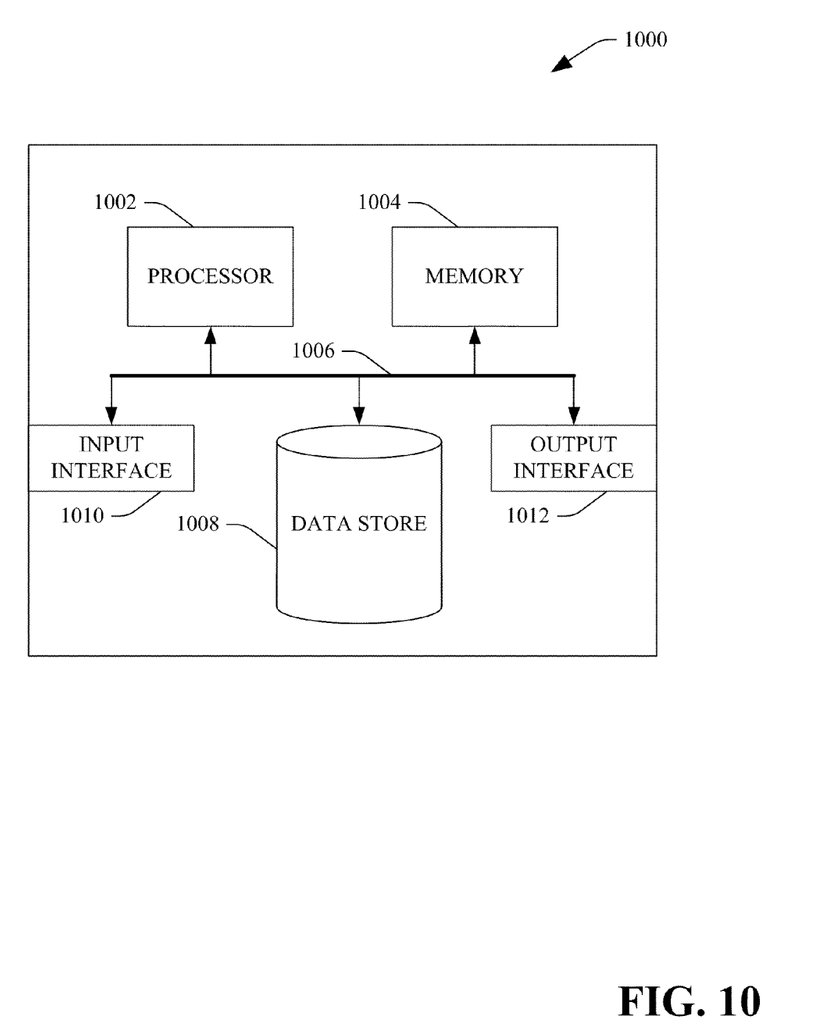
FIG. 10 is an example computing system.

Now referring to FIG. 10, a high-level illustration of an example computing device 1000 that can be used in accordance with the systems and methodologies disclosed herein is illustrated. For instance, the computing device 1000 may be used in a system that supports inferring/determining data object types with respect to generic pointers in source code. In another example, at least a portion of the computing device 1000 may be used in a system that supports generating a type graph. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store source code, type graphs, points-to graphs, etc.

The computing device 1000 additionally includes a data store 1008 that is accessible by the processor 1002 by way of the system bus 1006. The data store 1008 may include executable instructions, source code, a points-to graph, a points-to analysis algorithm, etc. The computing device 1000 also includes an input interface 1010 that allows external devices to communicate with the computing device 1000. For instance, the input interface 1010 may be used to receive instructions from an external computer device, from an individual, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
    generating a points-to graph based upon execution of a points-to analysis algorithm over source code in a computer-readable medium of a computing device, the points-to graph is a directed graph that comprises a first node, a second node, and a directed edge from the first node to the second node, the first node represents a first pointer in the source code, the second node represents a second pointer in the source code, and the edge indicates that an object pointer derivable from the second pointer is also derivable from the first pointer, the second pointer being a generic pointer, the generic pointer points to a data object that has a type that is unextractable from definitions corresponding to pointers in the source code;
    inferring the type of the data object pointed to by the second pointer in the source code based upon the points-to graph;
    generating a type graph based upon the inferred type of the data object pointed to by the generic pointer;
    performing a memory analysis over contents of memory of the computing device based upon the generated type graph, wherein performing the memory analysis comprises outputting an indication as to integrity of data in the memory.

2. The method of claim 1, wherein the type graph comprises a third node that represents the type of the data object, a fourth node that represents a global variable, and a second edge between the third node and the fourth node that represents a relationship between the type of the data object and the global variable.

3. The method of claim 2, wherein the type graph is a directed graph, and wherein the second edge is labeled to indicate an offset pertaining to the type of the data object and the global variable.

4. The method of claim 3, the second edge is labeled with a first value and a second value, the first value indicates that a pointer field at a first offset in the type of the data object points to the global variable at a second offset.

5. The method of claim 4, the type graph comprises object type definitions, declared types and relative addresses of global variables, and candidate target types for generic pointers.

6. The method of claim 1, the points-to graph is a pre-transitive graph.

7. The method of claim 1, the source code is source code for a kernel of an operating system.

8. The method of claim 1, the points-to analysis algorithm is a field-sensitive algorithm.

9. The method of claim 1, the points-to analysis algorithm is a context-sensitive algorithm.

10. The method of claim 9, context-sensitivity is enforced by ensuring that a sequence of call/return operations in the source code is valid.

11. The method of claim 1, the points-to analysis algorithm is a field sensitive algorithm and a context-sensitive algorithm.

12. The method of claim 1, the second pointer is a void pointer.

13. A system comprising:
at least one processor; and
memory that comprises computer-executable instructions that, when executed by the at least one processor, cause the at least one processor to perform acts comprising:
receiving source code from a computer-readable medium of a computing device, the source code comprises:
a plurality of data objects;
a generic pointer that points to a data object in the plurality of data objects, the data object has a type that is unextractable from definitions corresponding to pointers in the source code; and
type definitions for respective types of data objects in the plurality of data objects;
executing a points-to analysis algorithm over the source code to generate a points-to graph, the points-to graph is a directed graph that comprises:
a first node that is representative of the generic pointer;
a second node that is representative of a second pointer; and
a directed edge from the second node to the first node, the directed edge indicates that object pointers derivable from the generic pointer are also derivable from the second pointer;
inferring the type of the data object pointed to by the generic pointer based upon the type definitions, global variables in the source code, and the points-to graph;
generating a type graph based upon the inferred type of the data object pointed to by the generic pointer; and
performing a memory analysis over contents of the memory based upon the generated type graph, wherein performing the memory analysis comprises outputting an indication as to whether the source code, when compiled and executed, has a memory leak corresponding thereto.

14. The system of claim 13, the source code is source code of an operating system kernel.

15. The system of claim 13, the type graph is a directed graph, and each edge in the type graph is labeled to indicate offsets pertaining to a data type and/or global variable connected by an edge.

16. The system of claim 15, a first edge in the type graph connects a first node that represents a first data type or global variable to a second node that represents a second data type or global variable, the first edge is labeled with a first value and a second value, the first value indicates that a pointer field at a first offset in the first data type or global variable points to the second data type or global variable at a second offset.

17. The system of claim 13, the source code is written in C/C++ program language.

18. The system of claim 13, the generic pointer is a void pointer.

19. A computing device that comprises computer-readable memory, the computer-readable memory comprising instructions that, when executed by a processor, cause the processor to perform acts comprising:
accessing a data repository in a computing device to retrieve source code of an operating system kernel;
executing a field-sensitive and context-sensitive points-to algorithm over the source code to generate a points-to graph, the points-to graph comprises:
a first node that represents a first pointer in the source code;
a second node that represents a generic pointer in the source code, the generic pointer points to a data object in the source code, the data object has a type that is unextractable from definitions corresponding to points in the source code; and
a directed edge between the first node and the second node, the directed edge represents an inclusion relationship between the first pointer and the generic pointer, the points-to graph is intransitive;
determining the type of the data object pointed to by the generic pointer based upon the points-to graph; and
performing a kernel integrity check of the operating system kernel based upon the type of the data object pointed to by the generic pointer, wherein performing the kernel integrity check comprises outputting an indication as to integrity of dynamic data corresponding to the operating system kernel when the source code is compiled and executed.

20. The computing device of claim 19, wherein the generic pointer is a void pointer.

* * * * *